United States Patent Office 2,918,444
Patented Dec. 22, 1959

2,918,444

POLYEPOXIDE COMPOSITIONS

Benjamin Phillips, Charleston, Charles W. McGary, Jr., South Charleston, and Charles T. Patrick, Jr., St. Albans, W. Va., assignors to Union Carbide Corporation, a corporation of New York No Drawing. Application August 8, 1957
Serial No. 676,914

25 Claims. (Cl. 260—31.2)

This invention relates to polyepoxide compositions. In one aspect this invention relates to curable, polymerizable compositions comprising divinylbenzene dioxide and polycarboxylic acid anhydrides, and to the partially cured and cured compositions resulting therefrom.

This application is a continuation-in-part of copending application Serial No. 676,913, entitled "Epoxide Compositions" by B. Phillips, C. W. McGary, and C. T. Patrick, Jr., filed August 8, 1957, and assigned to the same assignee as the instant application.

The polymerizable compositions of this invention are low-viscosity, homogeneous liquids at room temperatures or at higher temperatures. These compositions can be easily handled in such resin-forming operations as coating, laminating, bonding, molding, casting, potting, calendering and the like. They are capable of accepting solid materials, such as filters and pigments, for providing various effects in physical properties and coloration. With or without such added solid materials, they can be made to fill small intricacies of molds without the necessity of applying high pressures or heating to high temperatures, although such measures can be employed, if desired. The compositions also can be easily spread, brushed, or sprayed by many techniques available in the paint, lacquer, and varnish industries for making coatings and finishes. Little, if any, shrinkage occurs in curing to the resin. The polymerizable compositions are capable of being accurately shaped by molds having intricate molding surfaces and cured to resins carrying exact details of such molding surfaces. They can be also advantageously employed in the potting of such fragile articles as electronic components.

The cured compositions, i.e., resins, of this invention are transparent, water-resistant solids. These resins vary from soft and flexible to hard and rigid products, depending upon the proportion, the functionality, and the chain length of the polycarboxylic acid anhydride employed. The hard, infusible, rigid, thermoset resins are insoluble in most organic vehicles. These resins can be machined to desired shapes and configurations and can be polished to provide appealing finishes. They can be made into articles having advantageous physical properties at high temperatures.

Many of the curable, polymerizable compositions of this invention are mobile liquids possessing viscosities as low as 50 centipoises at approximately 25° C. and are particularly capable of being easily prepared and conveniently applied to form bubble-free resins. The low viscosity of the curable compositions of this invention and the bubble-free resins obtained therefrom on curing stand in contradistinction to the commercial epoxide systems. The commercial epoxide resins such as those prepared from mixtures of acid anhydrides and polyglycidyl ethers of polyhydric phenols have achieved a degree of usefulness in the synthetic resins but are limited by certain inherent characteristics to a restricted field of application. The viscosities of these mixtures are relatively high (of the order of 10,000 centipoises, and higher, at 25° C. without solvents or diluents) as to preclude easy handling and application. Although diluents can be used in the preparation of commercial resins, there are the disadvantages of higher cost and low strength properties of resins prepared therefrom. Mixtures of anhydrides and polyglycidyl ethers of polyhydric phenols have been found heretofore to have extremely slow curing rates. In contrast, it has been observed that the curable compositions of the instant invention exhibit more practical and faster rates of cure.

The curable, polymerizable compositions of this invention also can be partially reacted at elevated temperatures to form viscous liquids or soft gels which on cooling, for example, to room temperature, can be viscous liquids or solid capable of being powdered or granulated and dissolved in a suitable organic solvent such as ethyl acetate or methyl isobutyl ketone and applied as heat-curable coatings. These partially reacted curable compositions can be also used as molding powder compositions which can be converted to infusible products by the application of heat and pressure.

Accordingly, one or more of the following objects will be achieved by the practice of this invention.

It is an object of this invention to prepare novel curable, partially cured, and cured compositions comprising divinylbenzene dioxide and a polycarboxylic acid anhydride. It is another object of this invention to prepare novel curable compositions comprising divinylbenzene dioxide and a polycarboxylic acid anhydride which are mobile liquids having viscosities as low as 50 centipoises at room temperature, i.e., about 25° C. It is a further object of this invention to prepare novel curable and partially cured compositions comprising divinylbenzene dioxide and a polycarboxylic acid anhydride which when dissolved in a suitable organic solvent are useful in the fields of coatings, adhesives, and the like. A still further object of this invention is directed to a novel process of reducing the gelation period of a curable composition comprising divinylbenzene dioxide and a polycarboxylic acid anhydride. A yet further object of this invention is to prepare novel intermediate reaction products resulting from the partial reaction of a composition comprising divinylbenzene dioxide and a polycarboxylic acid anhydride. Another object of this invention is directed to the preparation of novel curable, partially cured, and cured compositions comprising divinylbenzene dioxide and a polycarboxylic acid anhydride which are modified by polycarboxylic acid compounds to give a wide variety of useful properties and characteristics to said compositions. Numerous other objects of the present invention will become apparent to those skilled in the art from a consideration of the instant specification.

In one embodiment, this invention is directed to curable, polymerizable compositions comprising (a) divinylbenzene dioxide characterized by the following formula:

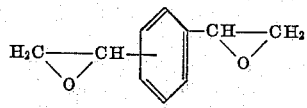

and (b) a polycarboxylic acid anhydride in proportions so as to provide from about 0.2 to 3.0 carboxyl equivalents of anhydride per epoxy equivalent of diepoxide. These diepoxide-anhydride systems can be further modified, so as to obtain a variety of useful physical properties, by the inclusion or addition of a polycarboxylic acid compound, such as polycarboxylic acids and acid esters, in an amount so as to provide up to 1.0 carboxyl equivalent of polycarboxylic acid compound per epoxy equivalent of diepoxide. Any of the three isomeric forms of divinylbenzene dioxide, i.e., ortho-, meta-, or para-divinylbenzene dioxide, or mixtures thereof, can be employed as starting material for the preparation of the novel compositions of this invention.

The polymerizable, curable divinylbenzene dioxide-polycarboxylic acid anhydride systems, modified or unmodified with a polycarboxylic acid compound, can be expressed as compositions comprising (a) divinylbenzene dioxide, (b) a polycarboxylic acid anhydride in an amount having $x$ carboxyl equivalents per epoxy equivalent of said diepoxide, and (c) a polycarboxylic acid compound in an amount having $y$ carboxyl equivalents per epoxy equivalent of said diepoxide, wherein $x$ is a number in the range from about 0.2 to 3.0, preferably from about 0.4 to 2.0; $y$ is a number in the range from 0.0 to 1.0; the sum of $x$ plus $y$ is not greater than 3.0, preferably not greater than 2.0; and $x/y$ is at least 1.0.

The proportions of the reactants are preferably expressed in terms of available carboxyl groups or carboxyl equivalent per available epoxy group or epoxy equivalent. Accordingly, by the term "carboxyl equivalent" as herein employed, is meant the number of carboxyl groups contained by an amount of polycarboxylic compound. For example, the "carboxyl equivalent" of a dicarboxylic acid is two. In the case of a dicarboxylic acid anhydride, the term "carboxyl equivalent" is meant to indicate the number of carboxyl groups which would be contained by an amount of the corresponding dicarboxylic acid. Thus, for example, one mole of a dicarboxylic acid anhydride would have a "carboxyl equivalent" of two. Also, as employed herein, the term "epoxy equivalent" is intended to represent the number of epoxy groups,

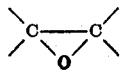

contained by an amount of epoxide compound. Thus, in the diepoxide-polycarboxylic acid anhydride systems, modified or unmodified by the addition of a polycarboxylic acid compound, the terms $x$ and $y$ are employed to signify carboxyl equivalents of the anhydride and acid compound, respectively, per epoxide equivalent. Thus, since it has been discovered that useful compositions are obtained by employing amounts of polycarboxylic acid anhydride and divinylbenzene dioxide so as to provide from about 0.2 to 3.0 carboxyl equivalents of anhydride per epoxy equivalent of diepoxide, and consequently, $x$ will be a number in the range from about 0.2 to 3.0. Upon the addition, if desired, of a modifying polycarboxylic acid compound, the amount of polycarboxylic acid anhydride must, of course, be correspondingly decreased. Thus, it has been discovered that useful compositions are obtainable by the addition to the diepoxide-anhydride systems of a polycarboxylic acid compound in an amount so as to provide from 0.0 to 1.0 carboxyl equivalents of acid compound per epoxy equivalent of diepoxide, and, therefore, $y$ will be a number in the range from 0.0 to 1.0. The sum of $x$ plus $y$ is preferably not greater than 3.0, since it has been observed that products obtained by employing more than about 3.0 carboxyl groups per epoxy group in the system are unsuitable because they are oftentimes heterogeneous in nature. The lower limit of the sum of $x$ plus $y$ is not less than 0.2, since it has been observed that products obtained by employing less than 0.3 carboxyl group per epoxy group in the system are undesirable because they are liquids of varying viscosity or soft and tacky solids. In addition, the ratio of $x/y$ is at least 1.0 since the polycarboxylic acid anhydride is a major component of the system. The use of monocarboxylic acid anhydrides as a component of the curable compositions of this invention are unsatisfactory since liquid products of varying viscosity, or tacky products, are obtained. It is particularly preferred to employ divinylbenzene dioxide and polycarboxylic acid anhydride in amounts which provide from about 0.4 to about 2.0 carboxyl groups of anhydride per epoxy group of diepoxide. Within this preferred range hard, tough, infusible resins are obtained on curing the curable compositions.

The curable compositions of this invention, modified or unmodified with a polycarboxylic acid compound, can be readily prepared by mixing a polycarboxylic acid anhydride with divinylbenzene dioxide. It is preferred to agitate the curable composition, for example, by stirring or other suitable means, so as to obtain a homogeneous mixture. When a solid or highly viscous polycarboxylic acid anhydride is employed heating is advantageous in facilitating the formation of a solution. In any event the application of heat should not be prolonged to the extent that appreciable curing takes place. Catalysts can be added at this point or at any other point prior to curing or not at all, as desired.

The curable compositions of this invention can be heated to a temperature in the range from about 25° C. to about 250° C., preferably from about 50° C. to about 200 C., for a period of time to produce hard, infusible resin products. Temperatures higher than 250° C. can be used although some discoloration which may not be desired may be brought about in the resins thus formed. The time for effecting the complete cure will be governed, to an extent, on several factors such as the particular polycarboxylic acid anhydride employed, the proportions of divinylbenzene dioxide and anhydride used, the inclusion of a polycarboxylic acid compound modified, the temperature for effecting the cure, the use of a catalyst in the system, and other considerations. In general, the time for effecting the complete cure can vary from several minutes to as long as 24 hours and longer, depending upon the correlation of such factors as noted above. The polycarboxylic acid anhydrides derived from the more acidic acids, such as maleic acid, generally cure the fastest.

A higher curing temperature generally will provide a resin in less time than a lower curing temperature. One preferable method is to heat the curable compositions to a temperature within the range from about 50° C. to 150° C. to first partially cure the composition. A temperature from about 100° C. to 200° C. then can be used to complete the cure. However, any one or combination of two or more temperatures within the specified range of 25° C. to 250° C. can be employed, if desired, to effect the full cure. For casting purposes the preferred minimum temperature is that at which the reactants form a uniform melt, whereas for coatings and the preparation of laminates, the use of solvents will allow the use of lower temperatures.

While not wishing to be held to any particular theory or mechanics of reaction, it is believed that in curing, one epoxy group of the divinylbenzene dioxide molecule can be difunctional when reacted with polycarboxylic acid anhydrides, such that, the equivalent of two carboxy groups of the anhydride reacts with a single epoxy group to form two ester linkages,

interconnecting the epoxide molecule with the anhydride molecules. This reaction can be typified by the general equation:

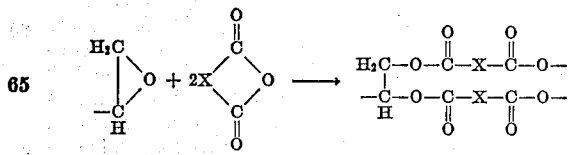

wherein

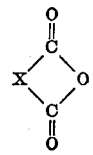

represent a polycarboxylic acid anhydride. This reaction of polycarboxylic acid anhydrides with divinylbenzene dioxide is believed to provide cross-linking. It is also believed that resins obtained by using dicarboxylic acid anhydrides having fewer atoms in the shortest chain between the carboxyl groups of the oxydicarbonyl group are more rigid than those made with dicarboxylic acid anhydrides having more atoms in said shortest chain. Some degree of cross-linking is believed to be brought about by etherification of epoxy groups of different divinylbenzene dioxide molecules during curing. It is also believed that during curing, one epoxy group can be monofunctional when reacted with polycarboxylic acids, such that, one carboxy group of the acid reacts with a single epoxy group to form an ester linkages, i.e.,

interconnecting the acid molecule, and a hydroxyl group attached to said epoxide molecule. This reaction can be represented by the equation:

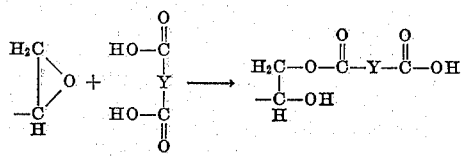

wherein

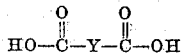

represents a polycarboxylic acid. A hydroxyl group such as that formed by this reaction and which is attached to the epoxide molecule is believed to be capable of reacting with an epoxy group, a carboxy group or an oxydicarbonyl group of a polycarboxylic acid anhydride to bring about cross-linking. By the use of polycarboxylic acids in our compositions, rigid resins, flexible resins or resins having intermediate degrees of flexibility or rigidity can be made, as desired. It is believed that compositions containing polycarboxylic acids tend to form more flexible resins than those not containing such polycarboxylic acids. Also those compositions which contain polycarboxylic acids having a large number of carboxy groups to the molecule form resins which tend to be more rigid than resins formed from compositions which contain polycarboxylic acids having fewer carboxy groups to the molecule. Resins obtained from compositions which contain dicarboxylic acids having greater numbers of carbon atoms in the shortest chain connecting the carboxy groups have been found to have a greater degree of flexibility than resins made from compositions containing dicarboxylic acids having fewer atoms in the shortest chain connecting the carboxy groups. It is possible, therefore, to produce resins of different degrees of flexibility and rigidity to suit a large variety of particular needs.

The resins of this invention can be characterized as having recurring interconnected units represented by the following formula:

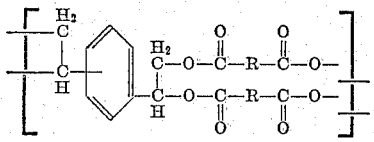

wherein R represents a polycarboxylic acid anhydride residue. By the term "polycarboxylic acid anhydride residue," as used herein, is meant a polyvalent group which can be regarded as the residue of a polycarboxylic acid anhydride molecule to which one, or more than one, oxydicarbonyl group of the formula:

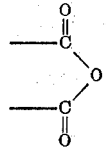

is attached to constitute said polycarboxylic acid anhydride molecule. Thus, a dicarboxylic acid anhydride molecule consists of the divalent group of the dicarboxylic acid anhydride residue to which one oxydicarbonyl group, as shown above, is attached.

Divinylbenzene dioxide is not a new compound. One preferred method of preparing divinylbenzene dioxide is the reaction of ortho-, meta-, or para-divinylbenzene with an excess of peracetic acid solution in an inert solvent such as acetone or ethyl acetate at approximately 70° C., followed by isolation of the diepoxide product by fractional distillation. Other modes of preparing divinylbenzene dioxide are more fully described in the literature.

Polycarboxylic acid anhydrides useful in producing the resins of this invention can be represented by the formula:

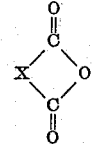

wherein X represents two or more carbon atoms interconnected by single or double bonds and to which such groups as hydrogen, alkyl, nitro, chloro, iodo, bromo, cyclic groups and the like or combinations thereof can be attached. X can also represent groups containing carbon atoms interconnected by single or double bonds and oxydicarbonyl groups, i.e.,

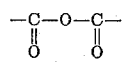

interconnecting the carbon atom groups to which such other groups as previously mentioned can be attached. X can also represent such cyclic groups as phenylene, cyclohexylene, and the like which can have one or more oxydicarbonyl groups attached thereto. One polycarboxylic acid anhydride or a mixture of two or more, as desired, can be used in our polymerizable compositions.

The polycarboxylic acid anhydrides which can be used in preparing the novel compositions include aliphatic, aromatic and cycloaliphatic acid anhydrides. The preferred anhydrides are the dicarboxylic acid anhydrides and preferably the hydrocarbon dicarboxylic acid anhydrides which include, for example, phthalic anhydride, tetrahydrophthalic anhydride, hexahydrophathalic anhydride, chlorendic anhydride, maleic anhydride, chloromaleic anhydride, dichloromaleic anhydride, glutaric anhydride, adipic anhydride, succinic anhydride, itaconic anhydride, heptylsuccinic anhydride, hexylsuccinic anhydride, methylbutylsuccinic anhydride, methyltetrahydrophthalic anhydride, n-nonenylsuccinic anhydride, octenylsuccinic anhydride, pentenylsuccinic anhydride, propylsuccinic anhydride, citraconic anhydride, 4-nitrophthalic anhydride, 1,2-naphthalic anhydride, 2,3-naphthalic anhydride, 1,8-naphthalic anhydride, tetrabromophthalic anhydride, tetraiodophthalic anhydride. Mixtures of anhydrides, polymeric anhydrides or mixed polymeric anhydrides of sebacic, adipic, pimelic, cyclohexane-1,4-dicarboxylic, terephthalic and isophthalic acids are also useful in preparing the novel compositions. Polycarboxylic acid anhydrides which have melting points below about 250° C. are satisfactory; those anhydrides possessing melting points below about 200° C. are preferred. Acid dianhydrides such as 1,2,4,5-benzenetetracarboxylic dianhydrides likewise are effective.

Among the polycarboxylic acid compounds which can be employed to modify the properties and characteristics of the divinylbenzene dioxide-polycarboxylic acid anhydride systems include the polycarboxylic acids having the following structural formula:

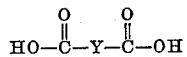

wherein Y represents a single bond or a divalent group composed of one carbon atom or groups of carbon atoms interconnected by single or multiple bonds, and to which groups such as hydrogen, alkyl, carboxy, chloro, bromo, cyclic groups and the like or combinations thereof can be attached. Y can also represent a divalent group containing groups of carbon atoms interconnected by single or multiple bonds and esters linkages, i.e.,

Y can represent cyclic groups such as phenylene, cyclohexylene, cyclohexenylene, and the like. Mixtures of polycarboxylic acids, or only one polycarboxylic acid, as desired, can be employed.

Illustrative polycarboxylic acids which are useful as modifiers in the preparation of the novel compositions include aliphatic, aromatic and cycloaliphatic dicarboxylic acids such as for example, oxalic acid, malonic acid, succinic acid, glutaric acid, adipic acid, pimelic acid, suberic acid, azealic acid, sebacic acid, alkylsuccinic acids, alkenylsuccinic acids, maleic acid, fumaric acid, itaconic acid, citraconic acid, mesaconic acid, glutaconic acid, muconic acid, ethylidenemalonic acid, isopropylidenemalonic acid, allylmalonic acid, 1,2-cyclohexanedicarboxylic acid, 1,4-cyclohexanedicarboxylic acid, 2-carboxy-2-methyl-cyclohexaneacetic acid, phthalic acid, isophthalic acid, terephthalic acid, 1,8-naphthalenedicarboxylic acid, 3-carboxycinnamic acid, 1,2-naphthalenedicarboxylic acid and tetrahydrophthalic acid. Preferred aliphatic dicarboxylic acids include aliphatic dibasic acids containing from five through ten carbon atoms. Other suitable polycarboxylic acid compounds include tricarboxylic acids such as 1,1,5-pentanetricarboxylic acid, 1,2,4-hexanetricarboxylic acid, 2-propyl-1,2,4-pentanetricarboxylic acid, 5 - octene-3,3,6-tricarboxylic acid, 1,2,3-propanetricarboxylic acid, 1,2,4-benzenetricarboxylic acid and the like. Polycarboxylic acids which have melting points below about 250° C. are suitable; these acids possessing melting points below about 200° C. are preferred.

Among the polycarboxylic acid compounds which can also be used in the compositions are compounds containing ester groups and more than one free carboxy group and can be aptly termed polycarboxy polyesters of polycarboxylic acids, such as those previously listed, or the corresponding anhydrides of said acids, such as those previously listed, esterified with polyhydric alcohols. By the term "polycarboxy polyester," as used herein, is meant a polyester containing more than one carboxy group per molecule. These polycarboxy polyesters can be prepared by known condensation procedures, employing mole ratios favoring greater than equivalent amounts of polycarboxylic acid or anhydride. More specifically, the amount of polycarboxylic acid or anhydride employed in the esterification reaction should contain more carboxy groups than are required to react with the hydroxyl groups of the amount of polyhydric alcohol reactant present. In forming polycarboxy polyesters that are useful in the compositions of this invention, it is preferable to use polycarboxylic acids or anhydrides, such as those previously named. In general, polycarboxy polyesters which have melting points below about 250° C. are satisfactory; those polycarboxy polyesters possessing melting points below about 200° C. are preferred.

Polyhydric alcohols which can be employed in preparing these polycarboxy polyesters include dihydric alcohols, such as ethylene glycol, diethylene glycol, triethylene glycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, 1,5-pentanediol, 2,4-pentanediol, 2,2-dimethyltrimethylene glycol, 1,4-hexanediol, 1,5-hexanediol, 1,6-hexanediol, 2,5-hexanediol, 3-methyl-1,5-pentanediol, 2-methyl-2,5-pentanediol, 3-methyl-2,5-pentanediol, 2,2-diethyl-1,3-propanediol, 2-ethyl-1,3-hexanediol, 2,5-dimethyl-2,5-hexanediol, 1,12-octadecanediol, 1-butene-3,4-diol, 2-butene-1,4-diol, 2-butyne-1,4-diol, 2,5-dimethyl-3-hexyne-2,5-diol, and the like; trihydric alcohols such as glycerol, trimethylolmethane, 1,2,6-hexanetriol, 1,1,1-trimethylolpropane, and the like; tetrahydric alcohols such as pentaerythritol, diglycerol, and the like; and higher polyhydric alcohols such as pentaglycerol, dipentaerythritol, polyvinyl alcohols and the like. Other polyhydric compounds can be prepared by the reaction of epoxides, e.g., 2,2'-bis(p-hydroxyphenyl)propane, and reactive hydrogen-containing organic compounds, e.g., amines, polycarboxylic acids, polyhydric compounds and the like. In forming polycarboxy polyesters that can be employed in the novel compositions it is preferable to use dihydric, trihydric or tetrahydric, aliphatic or oxa-aliphatic alcohols.

The mole ratios in which the polycarboxylic acid or anhydride can be reacted with polyhydric alcohols in preparing polycarboxy polyesters useful in the compositions are those which provide polyesters having more than one free carboxy group per molecule. In the case of trifunctional and tetrafunctional reactants in the esterification reaction, the mole ratios of the respective reactants must be such as to avert gelation. The mole ratio ranges of dicarboxylic acid to polyhydric alcohols that have been found to provide polycarboxy polyesters which can be used in the compositions of this invention are presented in Table I.

TABLE I

| Polyhydric Compound | Mole Ratio of Dicarboxylic Acid or Anhydride to Polyhydric Compound |
|---|---|
| Trihydric Compound | 2.2 to 3.0. |
| Tetrahydric Compound | 3.3 to 4.0. |

It is preferred, however, to employ polycarboxy polyesters prepared from dicarboxylic acids or anhydrides and polyhydric alcohols in the mole ratios specified in Table II:

TABLE II

| Polyhydric Compound | Mole Ratio of Dicarboxylic Acid or Anhydride to Polyhydric Compound |
|---|---|
| Trihydric Compound | 2.5 to 3.0. |
| Tetrahydric Compound | 3.5 to 4.0. |

The polycarboxylic polyesters described above can be obtained by condensing, in accordance with known procedures, a polyhydric alcohol and a polycarboxylic acid or anhydride. This condensation reaction may be conducted for example, by heating the reactants to a temperature within the range from 100° C. to 200° C. with or without an acidic catalyst. Water formed by the condensation reaction may be removed by distillation. The course of the reaction may be followed by making acid number determinations and the reaction can be stopped when a suitable polycarboxy polyester has been obtained.

In another embodiment of our invention acidic and basic catalysts can be employed in the curable divinylbenzene dioxide-polycarboxylic acid anhydride systems, modified or unmodified with a polycarboxylic acid compound, to increase the curing rate and reduce the gelation period of said systems. Catalysts which are effective include the mineral acids, e.g., sulfuric acid, perchloric acid, phosphoric acid, polyphosphoric acid, and the like; the sulfonic acids, e.g., ethylsulfonic acid, benzenesulfonic acid, toluenesulfonic, lower alkyl-substituted aromatic sulfonic acids, and the like; the metal halide Lewis acids, e.g., boron trifluoride, stannic chloride, zinc chloride, ferric chloride, aluminum chloride, boron trifluoride-piperidine complex, boron trifluoride-monoethylamine complex, boron trifluoride-1,6-hexanediamine complex, boron trifluoride-dimethyl ether complex, boron trifluoride-diethyl ether complex, and the like. Basic catalysts which can also be employed with advantageous effects to increase the cure rate and reduce the gelation period include the alkali metal hydroxides, e.g., sodium hydroxide, potassium hydroxide, and the like; the amines, e.g., alpha-methylbenzyldimethylamine, dimethylethylamine, dimethylaminomethylphenol, 2,4,6-tris(dimethylaminoethyl)phenol, triethylamine, trimethylammonium hydroxide, and the like.

Uniform dispersions of catalyst in the curable compositions of this invention prior to curing have been found to be desirable in order to minimize local curing around catalyst particles. Agitation of the curable compositions as the catalyst is added is sufficient when the catalyst is miscible with the composition. When the two, i.e., catalyst and curable composition, are immiscible, the catalyst can be added as a solution in an organic solvent. Typical solvents for the catalysts include organic ethers, e.g., diethyl ether, propyl ether and the like; organic esters, e.g., methyl acetate, ethyl propionate, and the like; organic ketones, e.g., acetone, cyclohexanone, and the like; organic alcohols, e.g., methanol, propylene glycol, and the like. Broadly, catalytic quantities of catalyst are sufficient to effectively reduce the gelation period. Catalyst concentrations up to 5.0 weight percent, and higher, based on the weight of divinylbenzene dioxide, have been found to be desirable. In general, a catalyst concentration in the range from about 0.001 to about 5.0 weight percent, based on the weight of the dioxide, is sufficient.

Another embodiment of this invention is directed to curable and partially cured compositions, i.e., divinylbenzene dioxide and polycarboxylic acid anhydride system, modified or unmodified with a polycarboxylic acid compound, with or without the use of a catalyst, said compositions being dissolved in a suitable organic solvent such as xylene, methyl isobutyl ketone, butyl acetate, ethyl acetate, toluene, amyl acetate, and the like. The compositions dissolved in the above exemplary list of solvents can be used as, for example, surface coating which can be subsequently heat cured to hard, tough, scratch-resistant coatings.

The proportion of partially cured resin to solvent will depend on various factors such as the particular mixture being cured, the degree or extent of the partial cure, the particular organic solvent employed, and other considerations. In general, a solution comprising from about 10 to about 90 weight percent of the partially cured resin, based on the total weight of partially cured resin and solvent, is suitable; from about 40 to 70 weight percent of the partially cured resin, based on the total weight of partially cured resin and solvent, is preferred. Moreover, the uncured compositions can be dissolved in the solvents exemplified above and applied to surfaces and subsequently heat cured to form hard, tough coatings. Should the solution comprising the uncured composition or partially cured composition tend to "run" when applied to the surface, a conventional wetting agent and/or thixotropic agent can be added to the solution mixture to insure a more uniform coating on the surface.

In the following illustrative examples, Barcol hardness values were determined by the use of Barcol Impressor GYZJ-934-1 at a temperature of 25° C. The divinylbenzene dioxide employed ranged in purity from 60.0 to 84.3 weight percent with the impurity substantially being ethylstyrene oxide. The proportions indicated in each example were calculated on the basis of the purity of the diepoxide as determined by the pyridine hydrochloride method of analysis. Unless otherwise indicated the examination or description of the resins were conducted at room temperature, i.e., 25° C.

Example 1

Divinylbenzene dioxide (0.81 gram) of 65.8 weight percent purity was admixed with phthalic anhydride (0.74 gram) so as to provide a mixture containing 2.3 carboxyl groups of anhydride per epoxy group of diepoxide. This mixture was heated to 120° C. with gelation occurring after 37 minutes. The system was subsequently cured for a total of 5 hours at 120° C. plus 6 hours at 160° C. There was obtained an amber colored resin possessing a Barcol hardness of 27.

Example 2

A mixture was prepared from 0.81 gram of divinylbenzene dioxide of 65.8 weight per cent purity and 0.5 gram of succinic anhydride. The resulting mixture contained 1.5 carboxyl groups per epoxy group. The resulting mixture was heated to 120° C. and gelation occurred after 3 minutes. The resulting gel was cured for 6 hours at 160° C. There was obtained an amber colored, tough resin having a Barcol hardness of 0.

Examples 3–15

Thirteen mixtures, each containing 1.10 grams of divinylbenzene dioxide of 74.0 weight percent purity and various proportions of phthalic anhydride, were prepared. The resulting mixtures were heated to 120° C. and maintained thereat for from 2 to 19 hours during which time gels were obtained with the exception of Example 3. The temperature was subsequently raised to effect a post cure at 160° C. for 5 hours. The results are set out in Table III below:

TABLE III

| Example No. | Phthalic Anhydride, grams | Equivalent Ratio[1] | Gel Time at 120° C., Minutes | Cure at 120° C., Hours | Description At Room Temperature |
|---|---|---|---|---|---|
| 3 | 0.148 | 0.2 | No gel | 19 | yellow, tough, Barcol, 0. |
| 4 | 0.222 | 0.3 | 390 | 11 | Do. |
| 5 | 0.296 | 0.4 | 310 | 11 | yellow, tough, Barcol, 25. |
| 6 | 0.592 | 0.8 | 95 | 2.5 | yellow, tough, Barcol, 45. |
| 7 | 0.74 | 1.0 | 86 | 2.5 | yellow, tough, Barcol, 49. |
| 8 | 0.924 | 1.25 | 83 | 2.5 | amber, tough, Barcol, 53. |
| 9 | 1.11 | 1.5 | 76 | 2 | amber, tough, Barcol, 45. |
| 10 | 1.30 | 1.75 | 66 | 2 | amber, tough, Barcol, 40. |
| 11 | 1.48 | 2.0 | 62 | 2 | amber, tough, Barcol, 0. |
| 12 | 1.85 | 2.5 | 58 | 2 | Do. |
| 13 | 2.22 | 3.0 | 53 | 2 | Do. |
| 14 | 2.59 | 3.5 | 49 | 2 | yellow, opaque, hard. |
| 15 | 2.96 | 4.0 | 80 | 2 | Do. |

[1] Equivalents of carboxyl groups per epoxy group.

Examples 16–19

Four mixtures, each containing 1.10 grams of divinylbenzene dioxide of 74.0 weight percent purity admixed with different anhydrides in the proportion of 1.25 carboxyl groups per epoxy group, were prepared. The resulting mixtures were heated to 120° C. and maintained thereat for from 1 to 14 hours during which time gels were obtained. All resins were post cured for 6 hours at 160° C., cooled to room temperature and examined. The results are set out in Table IV below:

TABLE IV

| Example No. | Anhydride | Grams | Gel Time at 120° C., Minutes | Cure at 120° C., Hours | Resin Description |
|---|---|---|---|---|---|
| 16 | Glutaric | 0.71 | 540 | 14 | amber, tough, Barcol, 0. |
| 17 | Polyadipic | 0.79 | 2 | 6.5 | yellow, tough, Barcol, 0. |
| 18 | Chlorendic | 2.32 | 55 at 80° C. | 1 | yellow, tough, Barcol, 50. |
| 19 | Succinic | 0.63 | 130 | 6 | amber, tough, Barcol, 0. |

*Example 20*

Divinylbenzene dioxide (19.0 grams) of 74.0 weight percent purity and phthalic anhydride (16.0 grams) were mixed in the proportion of 1.25 carboxyl groups per epoxy group. The resulting mixture was heated to 120° C. and maintained thereat for 100 minutes, a gel being formed after 40 minutes. After a post cure of 6 hours at 160° C. there was obtained an amber colored, tough resin having a Barcol hardness of 54.

*Example 21*

Two mixtures containing 0.81 gram of divinylbenzene dioxide of 65.8 purity and 0.56 gram of phthalic anhydride were prepared in such proportion so as to provide 1.1 carboxyl groups of anhydride per epoxy group of diepoxide. One drop of 1.0 weight percent of potassium hydroxide solution in methanol (a catalyst concentration of 0.025 weight percent, based on the weight of diepoxide) was added to one mixture and then both mixtures were heated to 120° C. and gel times were observed. The mixture containing catalyst gelled in 30 minutes; the uncatalyzed mixture required 75 minutes for gelation to occur.

*Example 22*

A mixture comprising 1.1 grams of divinylbenzene dioxide of 74.0 weight percent purity, 0.56 gram of phthalic anhydride, and 0.5 gram of sebacic acid was prepared. The mixture contained amounts of divinylbenzene dioxide, anhydride and acid which provided 0.75 carboxyl group of anhydride and 0.5 carboxyl group of acid per epoxy group of diepoxide. The resulting mixture was heated to 120° C.; gelation occurred after 3 minutes at 120° C. The mixture was maintained at 120° C. for 5 hours plus 6 hours at 160° C. There was obtained an amber colored, tough resin.

*Example 23*

A mixture comprising 1.1 grams of divinylbenzene dioxide of 74.0 weight percent purity, 0.37 gram of maleic anhydride, and 0.18 gram of adipic acid was prepared. The mixture contained amounts of divinylbenzene dioxide, anhydride and acid which provided 0.75 carboxyl group of anhydride and 0.25 carboxyl group of acid per epoxy group of diepoxide. The resulting mixture was then heated to 120° C.; gelation occurred in less than one minute at 120° C. The mixture was maintained at 120° C. for 5 hours plus 6 hours at 160° C. The product was an amber colored, hard, brittle resin.

*Example 24*

Divinylbenzene dioxide (1.1 grams of 74.0 weight percent purity), polyadipic anhydride (0.63 gram), and maleic acid (0.29 gram) were admixed so as to provide 1.0 carboxyl group of anhydride and 0.5 carboxyl group of acid per epoxy group of diepoxide. The resulting mixture was then heated to 120° C.; gelation occurred in less than one minute at 120° C. The mixture was maintained at 120° C. for 5 hours plus 6 hours at 160° C. The product was a yellow colored, tough resin.

*Example 25*

A mixture comprising 1.1 grams of divinylbenzene dioxide of 74.0 weight percent purity, 0.46 gram of glutaric anhydride, and 0.24 gram of an adduct of one mol of glycerol with 3 mols of succinic anhydride, was prepared. The mixture contained amounts of divinylbenzene dioxide, anhydride and adduct which provided 0.8 carboxyl group of anhydride and 0.2 carboxyl group of adduct per epoxy group of diepoxide. The resulting mixture was then heated to 120° C.; gelation occurred in 210 minutes at 120° C. The mixture was maintained at 120° C. for 5 hours plus 6 hours at 160° C. There was obtained an amber colored, tough resin.

*Example 26*

A mixture was prepared from 1.1 grams of divinylbenzene dioxide (74.0 weight percent purity), and 0.07 gram of phthalic anhydride. This mixture provided 0.1 carboxyl group per epoxy group. The resulting mixture was heated to 120° C. and maintained thereat for 22 hours during which time gelation did not occur. The temperature subsequently was raised to 160° C. for an additional six-hour period. Upon cooling to room temperature, an amber, viscous liquid was obtained.

*Example 27*

A mixture was prepared from 1.1 grams of divinylbenzene dioxide (74 weight percent purity) and 3.7 grams of phthalic anhydride. This mixture provided 5.0 carboxyl groups per epoxy group. The resulting mixture was heated to 120° C. and maintained thereat for 22 hours during which time gelation did not occur. The temperature subsequently was raised to 160° C. for an additional six-hour period. Upon cooling to room temperature, a pale amber, opaque product was obtained. The term "opaque" signifies that the product mass was heterogeneous in nature with crystals dispersed throughout.

*Example 28*

A mixture was prepared from 1.1 grams of divinylbenzene dioxide (74 weight percent purity) and 0.05 gram of succinic anhydride. This mixture provided 0.1 carboxyl group per epoxy group. The resulting mixture was heated to 120° C. and maintained thereat for 22 hours during which time gelation did not occur. The temperature subsequently was raised to 160° C. for an additional six-hour period. Upon cooling to room temperature, an amber, soft, tacky product was obtained.

*Example 29*

A mixture was prepared from 1.1 grams of divinylbenzene dioxide (74 weight percent purity) and 2.5 grams of succinic anhydride. This mixture provided 5.0 carboxyl groups per epoxy group. The resulting mixture was heated to 120° C. and maintained thereat for 22 hours during which time gelation did not occur. The temperature subsequently was raised to 160° C. for an additional six-hour period. Upon cooling to room temperature, a pale amber, opaque product was obtained.

*Example 30*

A mixture was prepared from 1.1 grams of divinylbenzene dioxide (74 weight percent purity) and 0.06 gram of polyadipic anhydride. This mixture provided 0.1 carboxyl group per epoxy group. The resulting mixture was heated to 120° C. and maintained thereat for 22 hours during which time gelation did not occur. The temperature subsequently was raised to 160° C. for an additional six-hour period. Upon cooling to room temperature a pale amber, soft, tacky product was obtained.

*Example 31*

A mixture was prepared from 1.1 grams of divinylbenzene dioxide (74 weight percent purity) and 3.15 grams of polyadipic anhydride. This mixture provided 5.0 carboxyl groups per epoxy group. The resulting mixture was heated to 120° C. and maintained thereat for 22 hours during which time gelation did not occur. The temperature subsequently was raised to 160° C. for an additional six-hour period. Upon cooling to room temperature, a pale amber, opaque product was obtained.

*Example 32*

A mixture was prepared from 1.1 grams of divinylbenzene dioxide (74 weight percent purity) and 0.5 gram of acetic anhydride. This mixture provided 1.0 carboxyl group per epoxy group. The resulting mixture was heated to 120° C. and maintained thereat for 35 hours during which time gelation did not occur. The temperature subsequently was raised to 160° C. for an additional six-hour period. Upon cooling to room temperature, an amber, highly viscous liquid was obtained.

*Example 33*

A mixture was prepared from 1.1 grams of divinylbenzene dioxide (74 weight percent purity) and 0.78 gram of butyric anhydride. This mixture provided 1.0 carboxyl group per epoxy group. The resulting mixture was heated to 120° C. and maintained thereat for 35 hours during which time gelation did not occur. The temperature subsequently was raised to 160° C. for an additional six-hour period. Upon cooling to room temperature, an amber, highly viscous liquid was obtained.

*Example 34*

A mixture was prepared from 1.1 grams of divinylbenzene dioxide (74 weight percent purity) and 1.1 grams of phthalic anhydride. This mixture provided 1.5 carboxyl groups per epoxy group. The resulting mixture was heated to 120° C. and maintained thereat for 45 minutes. On cooling to room temperature, i.e., approximately 25° C., there was obtained a soft, solid resinous product which partially dissolved in 5.0 grams of xylene at 100° C. An iron panel or strip was dipped into the resulting xylene-containing solution and removed therefrom shortly after. The iron panel then was allowed to air dry for 15 minutes, followed by baking said panel at 120° C. for 15 minutes plus an additional 30 minutes at 160° C. A thin coating was observed on that portion of the iron panel which was dipped into the xylene-containing solution. The resulting coating on the panel was clear, glossy, and tough. The coating displayed excellent adhesion and excellent acetone resistance. Efforts to scratch the coating, by hand, with a 9H Double Eagle pencil were futile.

Reasonable variations and modifications of this invention can be made or carried out in the light of the above disclosure without departing from the spirit and scope thereof.

What is claimed is:

1. A curable composition comprising (a) divinylbenzene dioxide; (b) a polycarboxylic acid anhydride in an amount having $x$ carboxyl equivalents per epoxy equivalent of diepoxide; and (c) a polycarboxylic acid in an amount having $y$ carboxyl equivalents per epoxy equivalent of diepoxide; wherein $x$ is a number in the range from about 0.2 to 3.0; $y$ is a number in the range from 0.0 to 1.0; the sum of $x$ plus $y$ is not greater than 3.0; and $x/y$ is at least 1.0 when $y$ is greater than 0.0.

2. A curable composition comprising (a) divinylbenzene dioxide; (b) a polycarboxylic acid anhydride in an amount having $x$ carboxyl equivalents per epoxy equivalent of diepoxide; and (c) a polycarboxylic acid in an amount having $y$ carboxyl equivalents per epoxy equivalent of diepoxide; wherein $x$ is a number in the range from about 0.4 to 2.0; $y$ is a number in the range from 0.0 to 1.0; the sum of $x$ plus $y$ is not greater than 2.0; and $x/y$ is at least 1.0 when $y$ is greater than 0.0.

3. A curable composition comprising (a) divinylbenzene dioxide; (b) a dicarboxylic acid anhydride having a melting point below about 250° C. in an amount having $x$ carboxyl equivalents per epoxy equivalent of diepoxide; and (c) a dicarboxylic acid having a melting point below about 250° C. in an amount having $y$ carboxyl equivalents per epoxy equivalent of diepoxide; wherein $x$ is a number in the range from about 0.2 to 3.0; $y$ is a number in the range from 0.0 to 1.0; the sum of $x$ plus $y$ is not greater than 3.0; and $x/y$ is at least 1.0 when $y$ is greater than 0.0.

4. A curable composition comprising (a) divinylbenzene dioxide; (b) a compound selected from the group consisting of an aliphatic dicarboxylic acid anhydride and a cycloaliphatic dicarboxylic acid anhydride which have a melting point below about 250° C. in an amount having $x$ carboxyl equivalents per epoxy equivalent of diepoxide; and (c) a dicarboxylic acid having a melting point below about 250° C. in an amount having $y$ carboxyl equivalents per epoxy equivalent of diepoxide; wherein $x$ is a number in the range from about 0.2 to 3.0; $y$ is a number in the range from 0.0 to 1.0; the sum of $x$ plus $y$ is not greater than 3.0; and $x/y$ is at least 1.0 when $y$ is greater than 0.0.

5. A curable composition comprising (a) divinylbene dioxide; (b) an aromatic dicarboxylic acid anhydride having a melting point below about 250° C. in an amount having $x$ carboxyl equivalents per epoxy equivalent of diepoxide; and (c) a dicarboxylic acid having a melting point below about 250° C. in an amount having $y$ carboxyl equivalents per epoxy equivalent of diepoxide; wherein $x$ is a number in the range from about 0.2 to 3.0; $y$ is a number in the range from 0.0 to 1.0; the sum of $x$ plus $y$ is not greater than 3.0; and $x/y$ is at least 1.0 when $y$ is greater than 0.0.

6. A curable composition comprising divinylbenzene dioxide and phthalic anhydride in an amount having from about 0.2 to 3.0 carboxyl equivalents per epoxy equivalent of diepoxide.

7. A curable composition comprising divinylbenzene dioxide and chlorendic anhydride in an amount having from about 0.2 to 3.0 carboxyl equivalents per epoxy equivalent of diepoxide.

8. A curable composition comprising divinylbenzene dioxide and succinic anhydride in an amount having from about 0.2 to 3.0 carboxyl equivalents per epoxy equivalent of diepoxide.

9. A curable composition comprising divinylbenzene dioxide and polyadipic anhydride in an amount having from about 0.2 to 3.0 carboxyl equivalents per epoxy equivalent of diepoxide.

10. A curable composition comprising (a) divinylbenzene dioxide; (b) maleic anhydride in an amount having $x$ carboxyl equivalents per epoxy equivalent of diepoxide; and (c) adipic acid in an amount having $y$ carboxyl equivalents per epoxy equivalent of diepoxide; wherein $x$ is a number in the range from about 0.2 to 3.0; $y$ is a number in the range from 0.0 to 1.0; the sum of $x$ plus $y$ is not greater than 3.0; and $x/y$ is at least 1.0 when $y$ is greater than 0.0.

11. A curable composition comprising (a) divinylbenzene dioxide; (b) a polycarboxylic acid anhydride in an amount having $x$ carboxyl equivalents per epoxy equivalent of diepoxide; and (c) a polycraboxylic acid in an amount having $y$ carboxyl equivalents per epoxy equivalent of diepoxide; wherein $x$ is a number in the range from about 0.2 to 3.0; $y$ is a number in the range from 0.0 to 1.0; the sum of $x$ plus $y$ is not greater than 3.0; and $x/y$ is at least 1.0 when $y$ is greater than 0.0, said curable composition being dissolved in an organic solvent, the resulting solution comprising from about 10 to about 90 weight percent of said curable composition, based on the total weight of curable composition and solvent.

12. A curable composition comprising (a) divinylbenzene dioxide; (b) a polycarboxylic acid anhydride in an amount having $x$ carboxyl equivalents per epoxy equivalent of diepoxide; (c) a polycarboxylic acid in an amount having $y$ carboxyl equivalents per epoxy equivalent of diepoxide; and (d) a catalytic quantity of a compound selected from the group consisting of mineral acids, sulfonic acids, metal halide Lewis acids, metal hydroxides, and amines; wherein $x$ is a number in the range from about 0.4 to 2.0; $y$ is a number in the range from 0.0 to 1.0; the sum of $x$ plus $y$ is not greater than 2.0; and $x/y$ is at least 1.0 when $y$ is greater than 0.0.

13. Thermosetting intermediate reaction products obtained under the influence of heat and by the partial reaction of a composition comprising divinylbenzene dioxide and a polycarboxylic acid anhydride, said composition containing from about 0.2 to about 3.0 carboxyl equivalents of said polycarboxylic acid anhydride per epoxy equivalent of divinylbenzene dioxide, said intermediate reaction products being dissolved in an organic solvent, the resulting solution comprising from about 10 to about 90 weight percent of said intermediate reaction products, based on the total weight of said intermediate reaction products and solvent.

14. Thermosetting intermediate reaction products obtained by the partial reaction of the composition of claim 1 under the influence of heat.

15. The polymerized, cured product obtained by heating the composition of claim 1.

16. Thermosetting intermediate reaction products obtained by the partial reaction of the composition of claim 2 under the influence of heat.

17. The polymerized, cured product obtained by heating the composition of claim 2.

18. The polymerized, cured product obtained by heating the composition of claim 3.

19. The polymerized, cured product obtained by heating the composition of claim 4.

20. The polymerized, cured product obtained by heating the composition of claim 5.

21. The polymerized, cured product obtained by heating the composition of claim 6.

22. The polymerized, cured product obtained by heating the composition of claim 7.

23. The polymerized, cured product obtained by heating the composition of claim 8.

24. The polymerized, cured product obtained by heating the composition of claim 9.

25. The polymerized, cured product obtained by heating the composition of claim 10.

References Cited in the file of this patent

UNITED STATES PATENTS

| | | |
|---|---|---|
| 2,623,023 | Koroly | Dec. 23, 1952 |
| 2,712,535 | Fisch | July 5, 1955 |
| 2,720,500 | Cody | Oct. 11, 1955 |
| 2,764,575 | Kohler et al. | Sept. 25, 1956 |
| 2,768,153 | Shokal | Oct. 23, 1956 |

OTHER REFERENCES

Everett et al.: "Journ. Chem. Soc." (1950), pp. 3131–3135. (Copy in Scientific Library.)